UNITED STATES PATENT OFFICE.

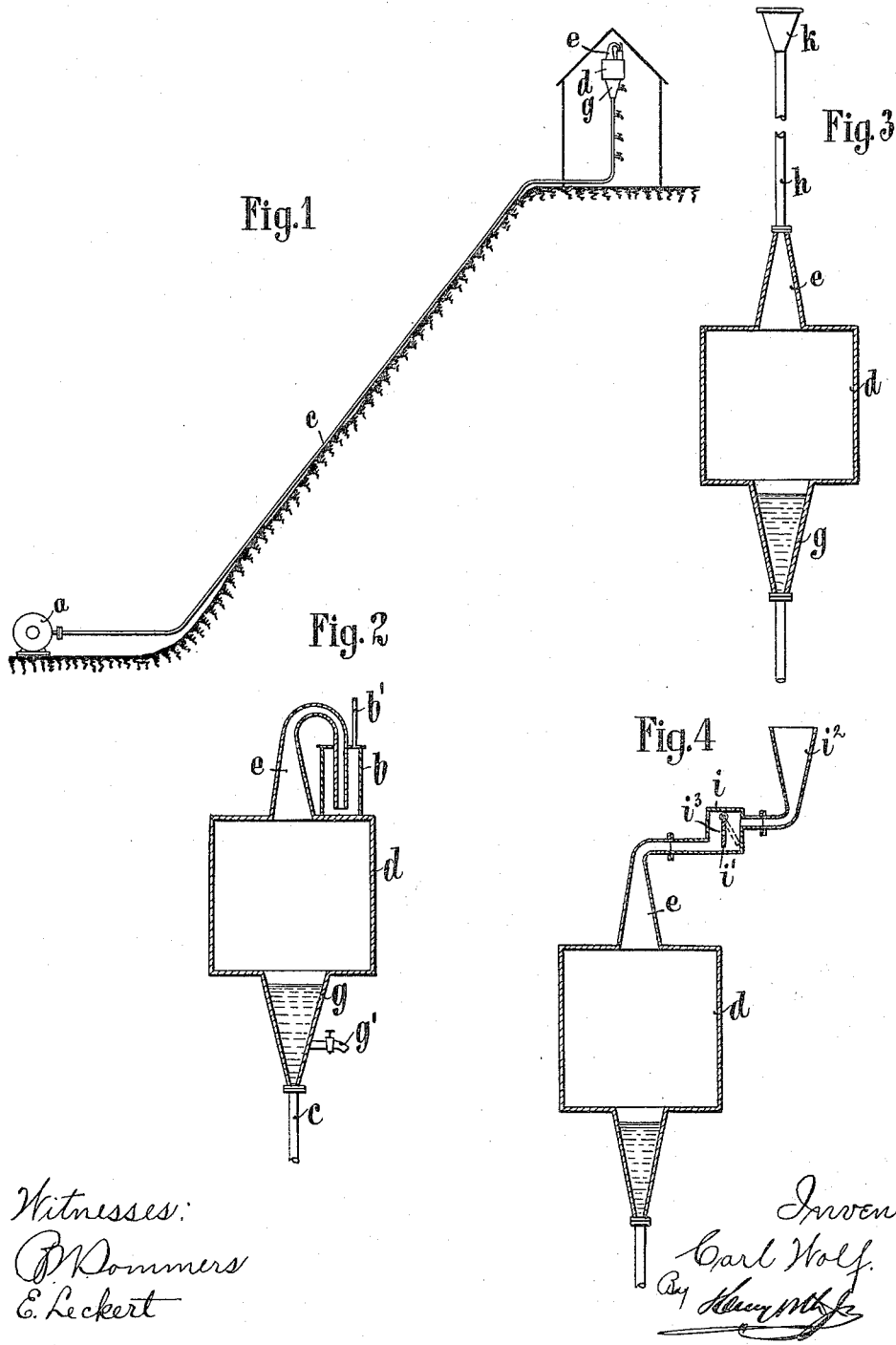

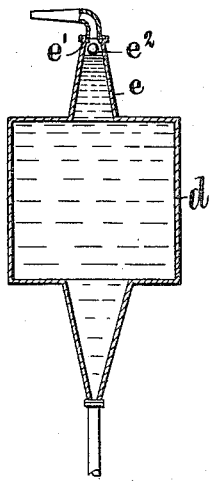
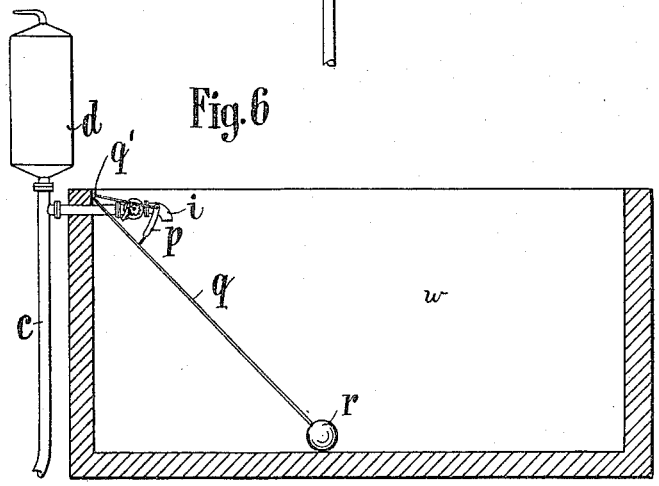
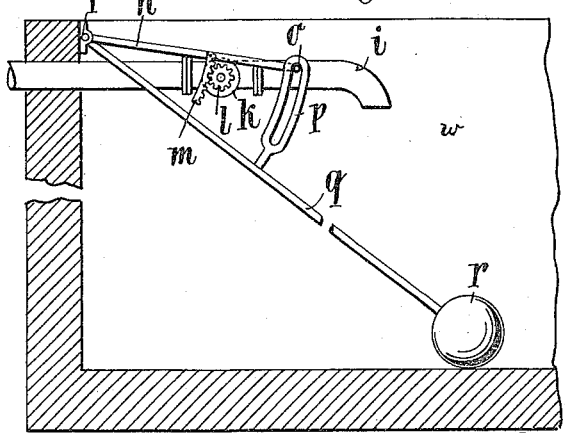

CARL WOLF, OF SCHWEINSBURG-ON-THE-PLEISSE, GERMANY.

WATER-SUPPLY SYSTEM.

1,155,024.  Specification of Letters Patent.  Patented Sept. 28, 1915.

Application filed March 1, 1915. Serial No. 11,349.

*To all whom it may concern:*

Be it known that I, CARL WOLF, manufacturer, a resident of Schweinsburg-on-the-Pleisse, in the Kingdom of Saxony, Germany, have invented new and useful Improvements in Water-Supply Systems, of which the following is a specification.

My invention relates to a water supply system for high situated houses and reservoirs supplied by a pump which is stopped automatically when the tank or reservoir is filled. The pump actuated preferably by an electric motor supplies a closed tank, provided with an overflow pipe which advantageously tapers outwardly. If the tank is filled with water, the surplus, flowing through this overflow pipe is throttled in such a manner, that by the back-pressure the pump is stopped automatically in a known manner. To increase the back pressure the overflow pipe may be provided with an ascending pipe or with a valve, which is closed by the entering water. The tank provided with the overflow pipe may also be used to supply a large reservoir, which is open or at least under atmospheric pressure. For this purpose the tank is provided with a delivery pipe, having a valve, through which all water, supplied by the pump can be delivered. This valve is controlled by a float in such a manner that the valve begins to close only if the reservoir is nearly filled. When the valve is closed, the tank provided with the overflow pipe is filled and when this is done the pump by the back pressure is stopped. The said valve is opened when the reservoir is nearly empty, whereupon the water, contained in the tank flows out. Hereby the pressure, working on the pump is diminished in such a degree, that the pump is actuated again automatically.

In the drawings the invention is shown in several modifications.

Figure 1 shows schematically a system for supplying a high situated house with water. Fig. 2 shows the tank provided with the overflow pipe. Fig. 3 shows a modification of the tank, having an ascending pipe. Fig. 4 shows a tank the overflow pipe of which is provided with a valve. Fig. 5 shows a modification of such a valve. Fig. 6 is a sectional view of a reservoir provided with the tank for controlling the valve of the delivery pipe. Fig. 7 is a similar view showing the valve and its actuating mechanism on a larger scale.

In the system shown in Fig. 1 the pump $a$, arranged in a valley and actuated preferably by an electric motor, not shown, such arrangement being generally known, is connected by the ascending pipe $c$ with the tank $d$ of a house, situated on a hill. The upper part of the tank $d$ is provided with a tapering overflow pipe $e$, the free end of which reaches nearly to the bottom of a receptacle $b$. This receptacle, which is provided with an air pipe $b^1$ receives the water flowing out of the pipe $e$. On the under side of the tank $d$ a funnel $g$ is arranged into which enters the ascending pipe $c$. The funnel $g$ is provided with a faucet $g^1$. When the tank $d$ is wholly filled with water by the pump, the water rises in the tapering pipe $e$ and is thereby throttled in such a manner, that the back pressure thus produced, is transmitted to the pump and stops the same in a known manner. The water forced out of the pipe $e$ by the last strokes of the pump is received in the receptacle $b$ and is sucked back by a siphon action, when water is drawn off the tank $d$. The special means for stopping the pump, are not shown in the drawings, such means being generally known. When by consumption of water the level has sunk nearly to the faucet $g^1$, the pressure, bearing on the pump has diminished in such a degree, that the pump is actuated again in a known manner, and the tank $d$ is filled again with water. The funnel $g$ on the under side of the tank $d$ gives the advantage, that if the tank is empty, the funnel $g$ contains still a quantity of water sufficient for a certain time, until the pump has again supplied water to the tank. If the room in the house above the tank $d$ is sufficiently high the upper end of the overflow pipe $e$ can be provided with an ascending pipe $h$ as shown in Fig. 3. The upper end of this pipe may be provided with a funnel $k$, having an outlet or overflow opening. In the narrow pipe $h$ the water rises rapidly, if the pipe $e$ has been filled and hereby the back pressure of the water column is increased in such a manner, that the pump is stopped without failure.

In the arrangement shown in Fig. 4, the overflow pipe $e$ terminates in a valve casing $i$, in which a swinging valve plate $i^1$ is arranged. To the casing $i$ may be connected a tube, terminating in a funnel $i^2$. In the normal vertical position of the valve plate its lower edge is not in contact with the bottom of the casing, but there is a small free space between the valve plate and the bottom of the casing, through which the air, displaced by the water, rising in the tank $d$ and the pipe $e$, may escape. By the water entering into the valve casing $i$, the valve plate is turned back until its lower edge bears against the back wall of the casing, as shown in dotted lines in Fig. 4. Hereby the access to the funnel $i^2$ is cut off and the back pressure of the water is rapidly increased. To prevent a bursting of the tubes, the valve plate $i^1$ is provided with a small opening $i^3$ through which a small quantity of water may escape in the closed position of the valve. Instead of the plate valve of course any other form of a valve may be used, as e. g. shown in Fig. 5 a ball valve $e^2$, floating on the water and rising with the same, until it is pressed against the valve seat $e^1$. The tank provided with the overflow pipe may also be used for filling a great open reservoir. For this purpose the tank $d$ is arranged on the upper end of the ascending pipe $c$, and the latter is provided with a delivery pipe feeding the reservoir. In this pipe a valve is arranged, through which all water, fed by the pump can escape. This valve is controlled by a float in such a manner, that the valve begins to close only if the reservoir is nearly filled with water. The valve being closed the water is fed into the said tank, provided with the overflow pipe, and if this tank is filled, the pump is stopped in the manner described. The valve of the delivery pipe is opened again by the float, if the reservoir is nearly empty. The water contained in the tank flows then through the valve into the reservoir and hereby the back pressure of the water in the ascending pipe is diminished to such a degree, that the pump is actuated again automatically. This arrangement is shown in Figs. 6 and 7 of the drawings. The ascending pipe $c$ of the pump (not shown) is provided with the delivery pipe $i$ discharging into the open reservoir $w$. In the pipe $i$ is arranged a rotary valve $k$, which is automatically closed, if the reservoir is filled. For this purpose a float $r$ is fixed on the end of a lever $q$, swinging on the pivot $q^1$ and having a slotted arm $p$. This arm engages the bolt $o$ of a lever $n$, also swinging on the pivot $q^1$. On the lever $n$ is fixed a toothed sector $m$ engaging with the toothed wheel $l$ fixed on the valve $k$. The slotted arm $p$ is so formed, that the lower end of the slot bears against the bolt $o$ of the lever $n$, if the float has nearly approached its raised position. If the float is then raised farther, the lever $n$ is taken along with the lever $q$, and the toothed arm $m$ turns the toothed wheel $l$ so that the valve $k$ is closed. The length of the slot of the arm $p$ is such, that the upper end of the slot bears against the bolt $o$ of the lever $n$, when the float is nearly in its lowest position. If further water is drawn off from the reservoir, so that the float $r$ sinks deeper, the lever $n$ is swung down and the valve $k$ is opened again.

On the upper end of the ascending pipe $c$ the tank $d$ is located, provided with the overflow pipe. When in the lowest position of the float $r$ the pump is brought into action, the water, raised by the pump, is delivered through the pipe $i$ and the open valve $k$ into the reservoir $w$. By the water rising in the reservoir the float $r$ is raised but the valve $k$ remains open until the float is raised to such a height, that the lower end of the slot of the arm $p$ bears against the bolt $o$ of the lever $n$, the valve $k$ is closed as above described. The pump, working on, then feeds the water to the tank. When this is filled and the water reaches the overflow pipe, the back pressure of the water is increased as described so that the pump is stopped. When by the consumption of water, the level of water in the reservoir sinks, and the float $r$ sinks also, the valve $k$ remains closed until the float $r$ has sunk to such a depth, that the upper end of the slot of the arm $p$ bears against the bolt $o$ of the lever $n$. In the further downward movement of the float $r$ the lever $n$ is swung downward and the valve $k$ is opened, so that the water, contained in the tank $d$ can escape through pipe $i$ and valve $k$ into the reservoir. Hereby the back pressure in the ascending pipe $c$ is diminished in such a degree, that the pump is actuated again in the known manner, for refilling the reservoir.

Several pumps located at distant springs may be used in the described manner for filling the same reservoir, each pump having the said tank with the overflow pipe.

I do not limit myself to the construction described and shown herein nor to any specific devices for accomplishing the same purposes as it is obvious that the devices may be greatly varied without departing from the spirit of my invention, but

What I claim and desire to secure by Letters Patent, is

1. In a water supply system, the combination with a riser pipe, and a pump for forcing water through the latter, of a back pressure device for actuating the mechanism for automatically controlling the operation of the pump, comprising a closed tank communicating with the pipe and provided with a small overflow pipe adapted to throttle the flow of water through the riser pipe.

2. In a water supply system, the combination with a riser pipe, and a pump for forcing water through the latter, of a back pressure device for actuating the mechanism for automatically controlling the operation of the pump, comprising a closed tank communicating with the pipe and provided with a small overflow pipe adapted to throttle the flow of water through the riser pipe, and means to increase the throttling action of the overflow-pipe.

3. In a water supply system, the combination with a riser pipe, and a pump for forcing water through the latter, of a back pressure device for actuating the mechanism for automatically controlling the operation of the pump, comprising a closed tank having a funnel on its under side through which it communicates with the pipe, and a throttling overflow pipe communicating with the tank through the top thereof.

4. In a water supply system, the combination with a riser pipe, and a pump for forcing water through the latter, of a back pressure device for actuating the mechanism for automatically controlling the operation of the pump, comprising a closed tank communicating with the pipe and provided with a small overflow-pipe having a contracted discharge end, whereby the flow of water in the riser pipe is throttled by the overflowing of the tank.

5. In a water supply system, the combination with a riser pipe, and a pump for forcing water through the latter, of a back pressure device for actuating the mechanism for automatically controlling the operation of the pump, comprising a closed tank communicating with the pipe and provided with a small overflow-pipe having a contracted discharge end, and an automatically operated valve in said end adapted to throttle the flow of water from the tank.

6. In a water supply system, the combination with a riser pipe, and a pump for forcing water through the latter, of a back pressure device for actuating the mechanism for automatically controlling the operation of the pump, comprising a closed tank communicating with the pipe and provided with a small overflow-pipe adapted to throttle the flow of water through the riser pipe, a reservoir, a delivery pipe connecting the latter with the riser pipe, a valve in the delivery pipe, and means operable by the water in the reservoir to automatically open and close said valve.

7. In a water supply system, the combination with a riser pipe, and a pump for forcing water through the latter, of a back pressure device for actuating the mechanism for automatically controlling the operation of the pump, comprising a closed tank communicating with the pipe and provided with a small overflow-pipe adapted to throttle the flow of water through the riser pipe, a reservoir, a delivery pipe connecting the latter with the riser pipe, a valve in the delivery pipe, means operable by the water in the reservoir to automatically open and close said valve, a float in the reservoir, and means operable by the float in its extreme positions for opening and closing the valve.

In testimony whereof I have signed my name to this specification, in the presence of two subscribing witnesses.

CARL WOLF.

Witnesses:
 SIGL.-ING KURT HERNEY,
 MAX PIETUSH.

Copies of this patent may be obtained for five cents each, by addressing the "Commissioner of Patents, Washington, D. C."